US007252589B1

(12) United States Patent
Marks et al.

(10) Patent No.: US 7,252,589 B1

(45) Date of Patent: Aug. 7, 2007

(54) METHOD OF PLAYING A SLOT MACHINE ("RE-SPIN & RE-PAY")

(76) Inventors: Daniel M. Marks, c/o High Five Games, 150 Airport Executive Park, Suite #2, Nanuet, NY (US) 10954; Anthony M. Singer, c/o High Five Games, 150 Airport Executive Park, Suite #2, Nanuet, NY (US) 10954; Howard M. Marks, c/o High Five Games, 150 Airport Executive Park, Suite #2, Nanuet, CT (US) 10954

( * ) Notice: Subject to any disclaimer, the term of this patent is extended or adjusted under 35 U.S.C. 154(b) by 708 days.

(21) Appl. No.: 10/666,560

(22) Filed: Sep. 22, 2003

Related U.S. Application Data

(60) Provisional application No. 60/412,012, filed on Sep. 20, 2002.

(51) Int. Cl.
*G06F 17/00* (2006.01)

(52) U.S. Cl. .......................................................... 463/16

(58) Field of Classification Search .................. 463/16, 463/20, 17, 18, 19; 273/143 R
See application file for complete search history.

(56) References Cited

U.S. PATENT DOCUMENTS

| | | | | |
|---|---|---|---|---|
| 5,580,053 | A | 12/1996 | Crouch | |
| 7,094,148 | B2 * | 8/2006 | Baerlocher et al. | 463/20 |
| 2004/0048646 | A1 * | 3/2004 | Visocnik | 463/16 |
| 2004/0137982 | A1 * | 7/2004 | Cuddy et al. | 463/20 |
| 2004/0266517 | A1 * | 12/2004 | Bleich et al. | 463/20 |
| 2006/0068885 | A1 * | 3/2006 | Cregan et al. | 463/20 |

* cited by examiner

*Primary Examiner*—Ronald Laneau

(57) ABSTRACT

A slot machine issues awards for winning combinations formed by an initial spin of all symbol positions in the symbol matrix and subsequent re-spins of all "unlocked" symbol positions until all symbol positions have been "locked." In a preferred embodiment, an initial spin uses all slot reels and pays for all winning combinations displayed; a pre-determined symbol "locks" all of the symbol positions on that slot reel; "unlocked" reels re-spin and re-pay until all slot reels are "locked." Other embodiments of the present invention are described within the application.

20 Claims, 16 Drawing Sheets

METHOD OF PLAYING A SLOT MACHINE ("RE-SPIN & RE-PAY")

RELATED APPLICATION

This application claims priority from U.S. Provisional Application No. 60/412,012, filed on Sep. 20, 2002, entitled "Card Games and Computer Implemented Games Using Interactive Network System for Implementing Same," and incorporated herein by reference.

BACKGROUND OF THE INVENTION

1. Field of Invention

This invention relates generally to payout methods in a mechanical, an electromechanical and/or computer-based slot machine-like games-of-chance and, more particularly, to awards for winning combinations formed by an initial spin of all symbol positions in the symbol matrix and subsequent re-spins of all "unlocked" symbol positions until all symbol positions have been "locked."

2. Background Description

To play a slot machine a player deposits money in the form of coins, gaming tokens or paper currency either into a coin head or bill acceptor. The coins and gaming tokens are collected in a reservoir inside the gaming machine while the paper currency is collected in the bill acceptor inside the gaming machine. If the coins, gaming tokens or paper currency are validated as authentic, the player accrues the appropriate number of playing credits on a credit meter. For example, a twenty-five cent gaming machine will accrue four credits for each dollar deposited into the gaming machine.

After accruing credits on the credit meter, the player determines how many credits he wishes to wager on the next spin of the slot reels. After setting the wager, the player spins the reels by pressing the spin button or by pulling a handle. When the reels stop spinning, symbols are displayed on the slot reels ("symbol matrix"). The player then collects credits for predetermined symbol combinations ("winning combinations"), if any, according to a pre-determined schedule ("pay table"). More specifically, the slot machine operates as follows:

- Symbol Matrix. Slot symbols are displayed on 3 or more columns (also called "slot reels") placed adjacent to each other. Each column contains at least 3 rows, with a symbol in each row. The resulting matrix of symbols ("symbol matrix") typically ranges from 3 columns by 3 rows with 9 total symbols to 5 columns by 3 rows with 15 total symbols. Within the symbol matrix, positions on the slot reels may be referred to according to column, from left to right, and row, from the top to bottom ("symbol positions"). For example: symbol position 1/2 is located in column 1 (i.e., left-most column) and row 2 (i.e., middle row).
- Winning Combinations. Players collect credits for predetermined winning symbol combinations that appear in specific locations ("pay lines") on the slot reels. Winning combinations typically require that three or more of the same symbols appear adjacent to each other starting from the leftmost position of a pay line ("line pays"). For example: a player may collect a line pay if 3 Banana symbols appeared in symbol positions 1/1, 2/1, 3/1 on a pay line using symbol positions 1/1, 2/1, 3/1, 4/1, and 5/1.
- Alternatively, players may also collect credits for predetermined winning combinations that appear anywhere on a pay line ("line scatter pays") or anywhere on the slot reels ("reel scatter pays"). For example, a player may collect a line scatter pay if 3 Banana symbols appeared in symbol positions 1/1, 3/1, 5/1 on a pay line using symbol positions 1/1, 2/1, 3/1, 4/1, and 5/1; and collect a reel scatter pay if 3 Banana symbols appeared anywhere on the slot reels.
- Pay Table. Credits are awarded to the player for each winning symbol combination based on a predetermined schedule ("pay table"). For line pays and line scatter pays, the number of credits wagered on the winning pay line multiplies the number of credits indicated by the pay table. For example, a player may wager two credits each on five pay lines, spin the reels, and collect twice the amount indicated on the pay table for a line pay or line scatter pay appearing on any of the five played pay lines. For reel scatter pays, the total number of credits wagered multiplies the number of credits indicated by the pay table. For example, a player may wager ten total credits, spin the reels, and collect ten times the amount indicated on the pay table for a reel scatter pay appearing on anywhere on the slot reels.

Following any type of pay (e.g., line pays, line scatter pays and reel scatter pays), the credits won are added to the player's balance of credits shown in the credit meter. As long as the player has credits on the credit meter, the player may continue to play the gaming machine or the player may collect the remaining balance of credits by pressing a Cash Out button the gaming machine. In addition, the player may view the rules of the game by pressing the Help button before any spin.

A conventional slot machine issues awards according to the methods described above and exemplified by FIGS. 1, 2, and 3. FIG. 1, U.S. Pat. No. 5,580,053 to Crouch, entitled Multi-Line Gaming Machine, incorporated herein by reference, discloses a gaming machine 50 that has a display 51 on which an array of symbols is displayed. The array is typically 3 rows×5 columns. During a game the symbols displayed on the array are caused to change with a random result being obtained. The player of the machine makes a wager on the result and is paid a prize if one of a number of predetermined combinations of symbols is displayed on a pay line of the display 51 at the end of the game. The player may make multiple wagers on each game with each wager being assigned to a different one of a plurality of possible pay lines. Typically, the number of possible pay lines is greater than or equal to 9, and the lines to be employed in each game are selected by switches 54, prior to a game being initiated.

FIG. 2, as disclosed in U.S. Pat. No. 5,580,053, shows a 3×5 display 51 having 12 pay lines, indicated by numerals 1 to 12 on the Figure. FIG. 3, as disclosed in U.S. Pat. No. 5,580,053, shows a 3×5 display 51 having 27 pay lines, indicated by numerals 1 to 27 on the Figure. U.S. Pat. No. 5,580,053 also states that machines having a 3×3 or 3×4 display size.

Since conventional slot machines are limited to the foregoing methods, players, casinos and manufacturers suffer from the following disadvantages:

- Players suffer from the boredom of playing "new" games with different graphics, but really use the same "old" game play methods and awards;
- Casinos suffer from the players' dissatisfaction with the casino's game selection as they cannot distinguish their game offerings from other casinos; and
- Game manufacturers suffer declining orders as they cannot distinguish their product line from the other manufacturers.

It is an object of the present invention to address the limitations associated with conventional slot machines by offering a new method of playing a slot machine. The addition of such a new method benefits all interested parties: the game manufacturer adds a unique product to their sales line; the casino attracts and retains players interested in playing an innovative slot game; and the player enjoys a new game and awards.

SUMMARY OF THE INVENTION

The present invention includes a variety of methods of play that can be programmed on an electronic video slot machine to issue awards for winning combinations formed by an initial spin of all symbol positions in the symbol matrix and subsequent re-spins of all "unlocked" symbol positions until all symbol positions have been "locked." ("Re-Spin & Re-Pay").

In a preferred embodiment of the present invention, the Re-Spin & Re-Pay concept allows the player to collect awards for each spin and re-spin, as follows:

Initial Spin:
- Player sets wager and spins reels;
- Following the initial spin, the player collects awards for all winning combinations;

Re-Spins 1 to N:
- All reels which do not contain a "stop" symbol, re-spin;
  - Stop symbols do not issue any line pays, scatter awards or other winning combinations.
  - Stop symbols do not act as "wild" symbols to help form other winning combinations.
- Following the re-spin, the player collects additional awards for all winning combinations;
- The game continues to re-spin reels until all reels contain a "stop" symbol.

For example, using the numbers 1 to 9 to represent the symbol set, with 10 representing the "stop" symbol, on reels 1 through 5:

Initial Spin

| Reel: 1 | 2 | 3 | 4 | 5 |
|---|---|---|---|---|
| 2 | 1 | 6 | 4 | *10* |
| **5** | **5** | **5** | 3 | 5 |
| 9 | *10* | *10* | 6 | 2 |

(Winning combination in bold.)
(Stop symbols in *italics*.)

The game awards credits for the winning symbol combination of 5-5-5 on reels 1, 2 and 3. With stop symbols displayed on reels 2, 3, and 5, the game re-spins reels 1 and 4, as follows:

Re-Spin 1

| Reel: 1 | 2 | 3 | 4 | 5 |
|---|---|---|---|---|
| 7 | 1 | 6 | *10* | *10* |
| 3 | 5 | 5 | 5 | 5 |
| 2 | *10* | *10* | 2 | 2 |

(Stop symbols in *italics*.)

The game awards no credits since there is no winning symbol combination. With stop symbols displayed on reels 2, 3, 4, and 5, the game re-spins reel 1, as follows:

Re-Spin 2

| Reel: 1 | 2 | 3 | 4 | 5 |
|---|---|---|---|---|
| 8 | 1 | 6 | *10* | *10* |
| **5** | **5** | **5** | **5** | **5** |
| 3 | *10* | *10* | 2 | 2 |

(Winning combination in bold.)
(Stop symbols in *italics*.)

The game awards credits for the winning symbol combination of 5-5-5-5-5 on reels 1, 2, 3, 4, and 5. With stop symbols displayed on reels 2, 3, 4, and 5, the game again re-spins reel 1, as follows:

Re-Spin 3

| Reel: 1 | 2 | 3 | 4 | 5 |
|---|---|---|---|---|
| 8 | 1 | 6 | *10* | *10* |
| *10* | 5 | 5 | 5 | 5 |
| 6 | *10* | *10* | 2 | 2 |

(Stop symbols in *italics*.)

The game awards no credits since there is no winning symbol combination. With stop symbols displayed on all of the reels, the game ends and the player receives the cumulative value of all awards.

The preferred embodiment of the present invention, therefore, offers a first spin of all the reels and multiple subsequent re-spins or some or all of the same slot reels, with each spin and re-spin offering another opportunity for an award.

Alternatively, the present invention allows for many alternative embodiments, including but not limited to the following:

- Any number of re-spins. The present invention allows for any number of re-spins of the symbol positions, from a single re-spin of a single symbol position to a limitless number of re-spins of every symbol position. For example, each symbol position may re-spin up to 10 times; or, groups of symbol positions, such as the positions on a slot reel, may re-spin up to 5 times. In addition, different symbol positions may re-spin different number of times. For example, symbol positions in reel 1 may spin up to 3 times but symbol positions in reel 5 may spin up to 12 times. Further, different types of symbols may re-spin different number of times. For example, line pay symbols may re-spin up to 7 times and scatter pay symbol do not re-spin.
- Any method of locking symbols. The present invention allows for any method of determining which symbol positions will lock (i.e. not re-spin). For example, all symbols may lock that are "stop" symbols; on reels with "stop" symbols; on paylines with "stop" symbols; on rows with "stop" symbols; and/or adjacent to a "stop" symbol.
- In addition, the present invention also allows for locking symbol positions based upon methods unrelated to "stop" symbols. Instead, symbol positions may lock according to any other methodology that results in the locking of some symbol position and the re-spinning of some or all of the other symbol positions in the symbol matrix. For example, for any initial spin resulting in a winning combination, the symbols involved in the winning combination are locked and the symbols not involved in the winning combination may re-spin and re-pay until no winning combinations are displayed.

Any method of unlocking symbol positions. The present invention allows for any method of unlocking symbol positions that have been locked, including unlocking symbols: after a fixed number, variable or random of spins; in response to an "unlock" symbol; in return for additional wager; in exchange for player input Any type of award for each re-spin. The present invention allows each re-spin to offer any type of award. For example, winning combinations award credits on the initial spin, prizes of the first re-spin, and credits again on all following re-spins. In addition, the number of re-spins in of themselves may result in an award. For example, 10 re-spins may result in an award of 100× the total bet.

Any amount of award for each re-spin. The present invention allows each re-spin to offer any amount of award. For example, winning combinations award 1× the amount indicated on the pay table for the initial spin, 2× on the first re-spin, 3× on the second re-spin, 4× on the third re-spin, and so on for all following re-spins.

Any limitation on the number of re-spins. The present invention allows for re-spins to conclude before all symbol positions have locked. For example, the game may end after 10 re-spins without locking all symbol positions. In addition, the present invention may issue an award upon completion of the final respin-spin. For example, the game may issue 100× the total bet upon completion of the $10^{th}$ re-spin.

All of these alternative embodiments rely upon the underlying Re-Spin & Re-Pay concept that provides awards for winning combinations formed by an initial spin of all the symbol positions and for additional winning combinations formed by subsequent re-spins of one or more the symbol positions.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other systems and methods for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The Detailed Description including the description of a preferred structure as embodying features of the invention will be best understood when read in reference to the accompanying figures wherein:

FIGS. 4*a-l* show illustrative examples of representative displays that may be encountered during a typical game in accordance with the principles of the present invention.

DETAILED DESCRIPTION OF A PREFERRED EMBODIMENT OF THE INVENTION

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

DESCRIPTION OF PREFERRED EMBODIMENT

The preferred embodiment of the present invention includes the play of the base game using the Re-Spin & Re-Pay concept, plus additional features, as described below:

Base Game. To play the base game, the player establishes a pool of credits, selects pay lines, sets the wager per pay line, spins the reels, collects credits for winning symbol combinations, and then may continue re-spin reels and collect credits for winning symbol combination.

Figure 1:
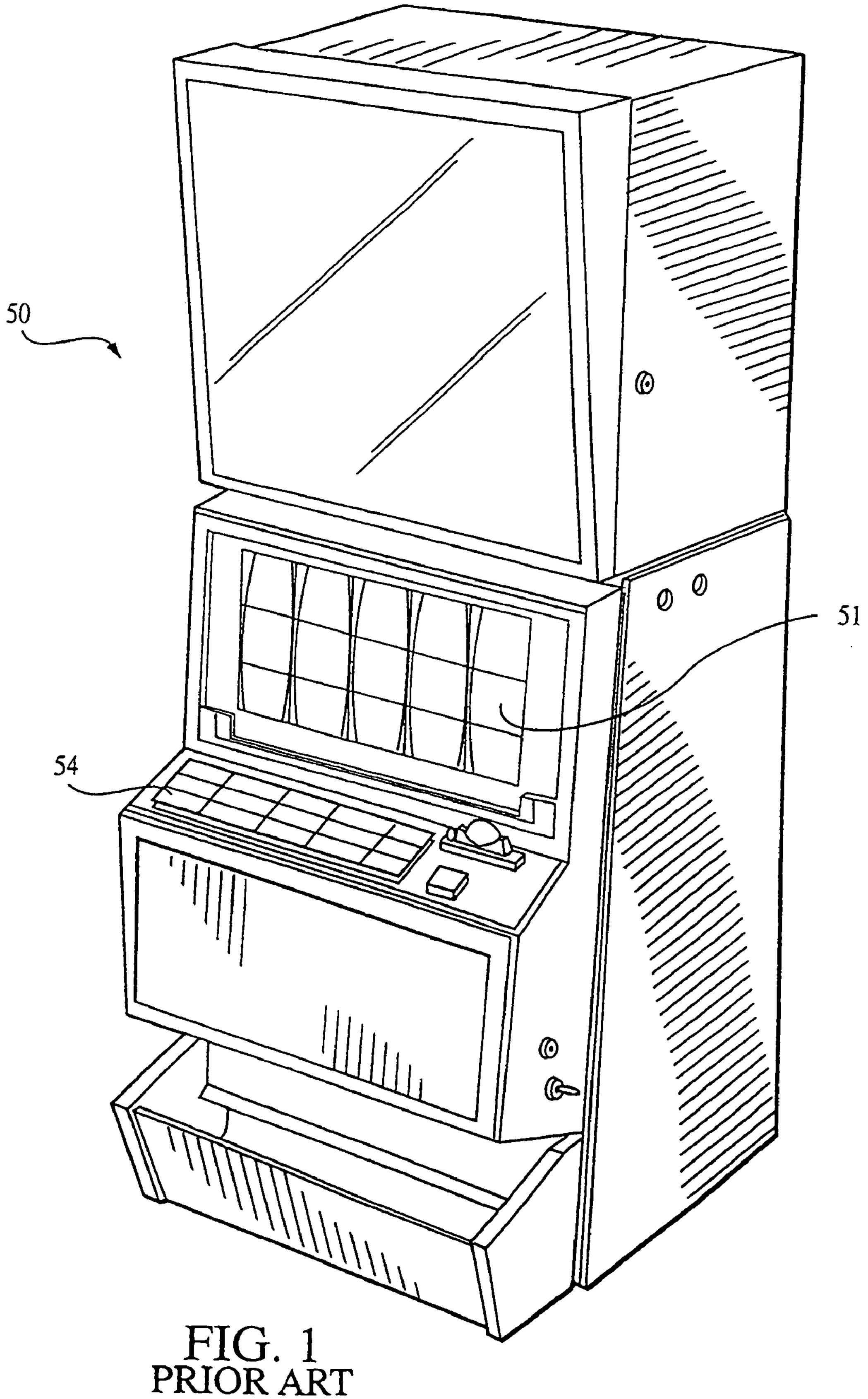
FIG. 1 PRIOR ART
FIG. 1 illustrates a prior art slot machine.
Figure 2:
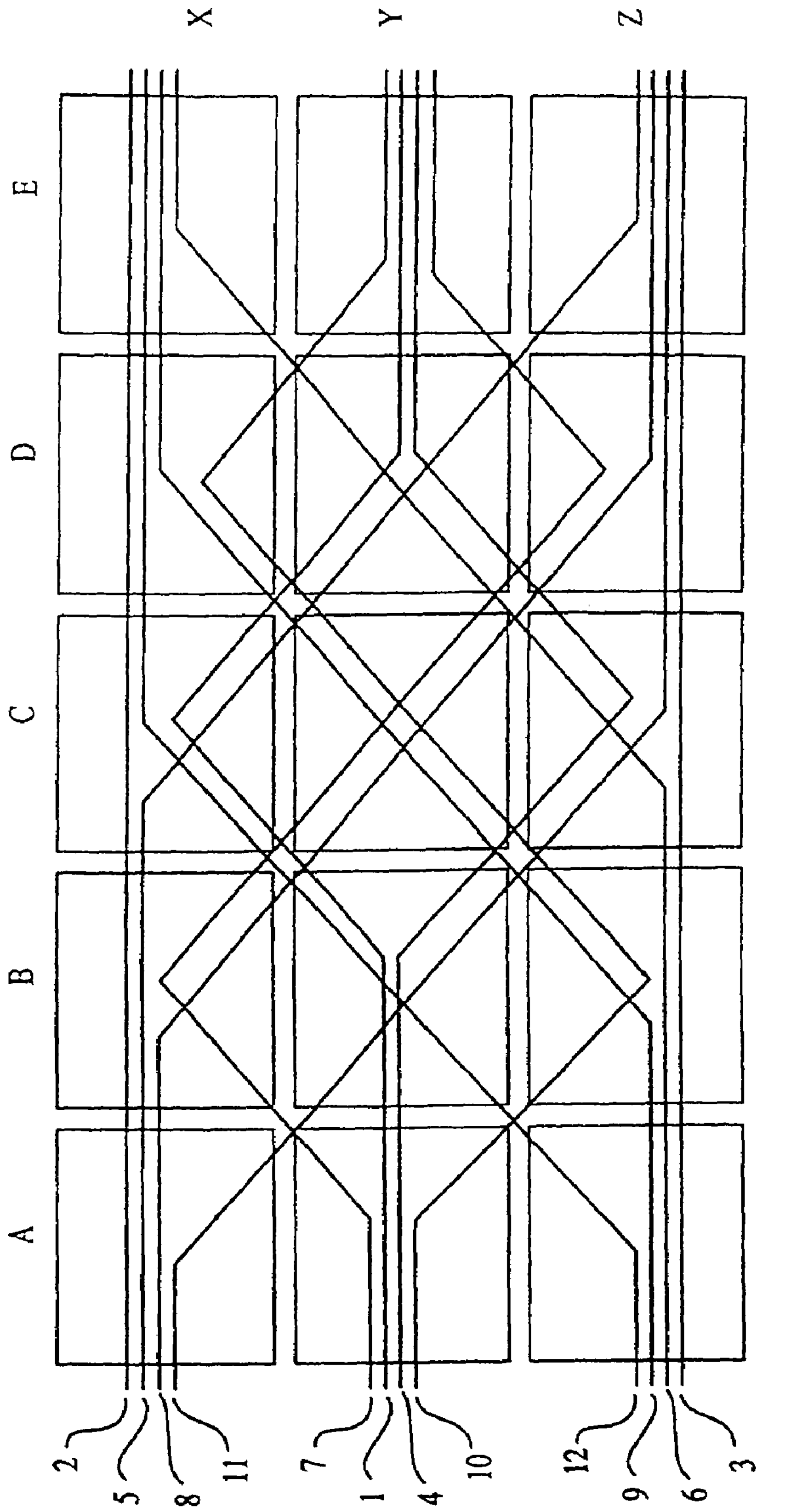
FIG. 2 PRIOR ART
FIG. 2 diagramatically illustrates a prior art 12 line multi-line pay arrangement for a machine with a 3×5 display format.
Figure 3:
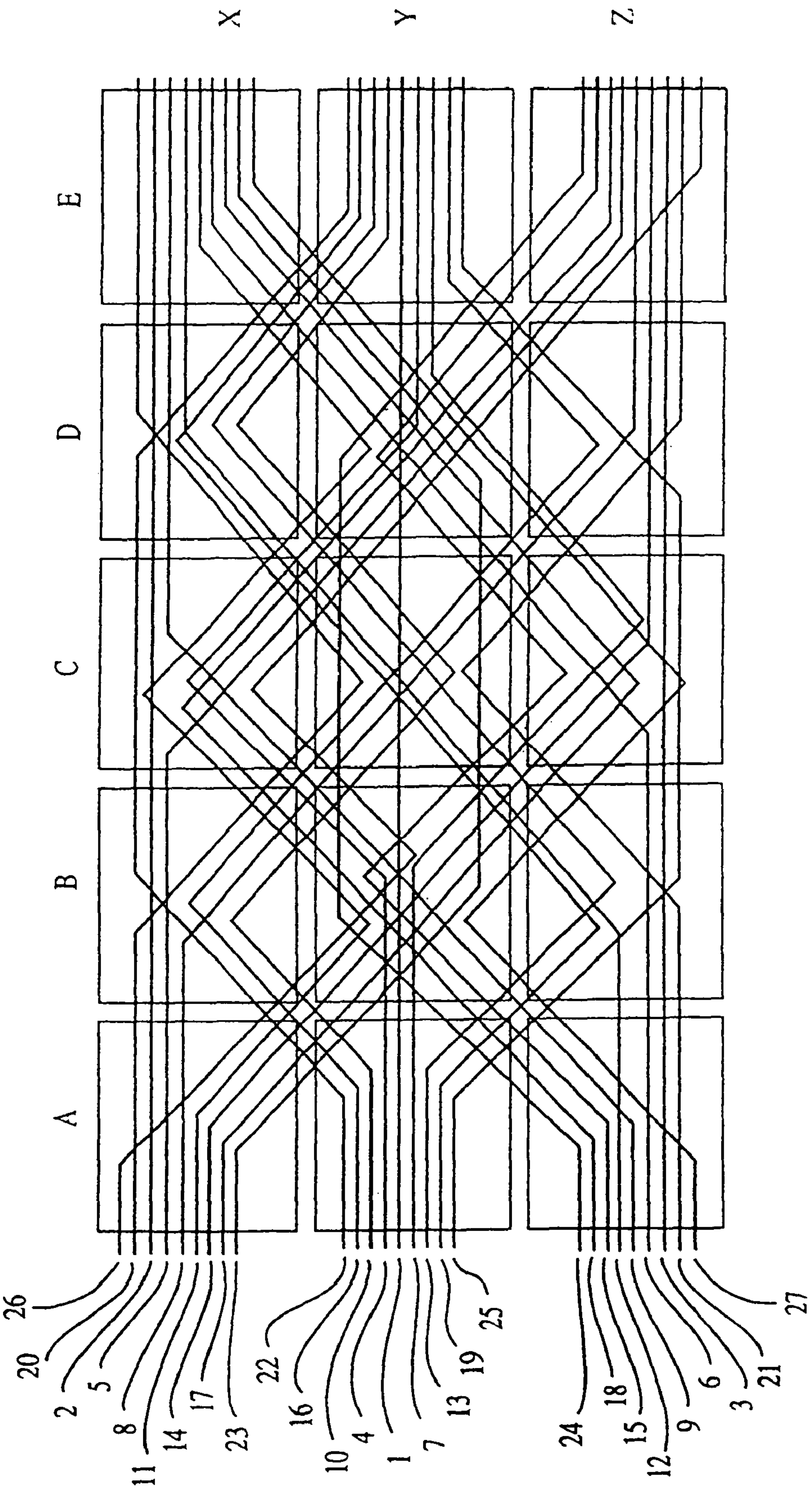
FIG. 3 PRIOR ART
FIG. 3 diagrammatically illustrates a prior art 27 line multi-line pay arrangement for a machine with a 3×5 display format.
Figure 4A:
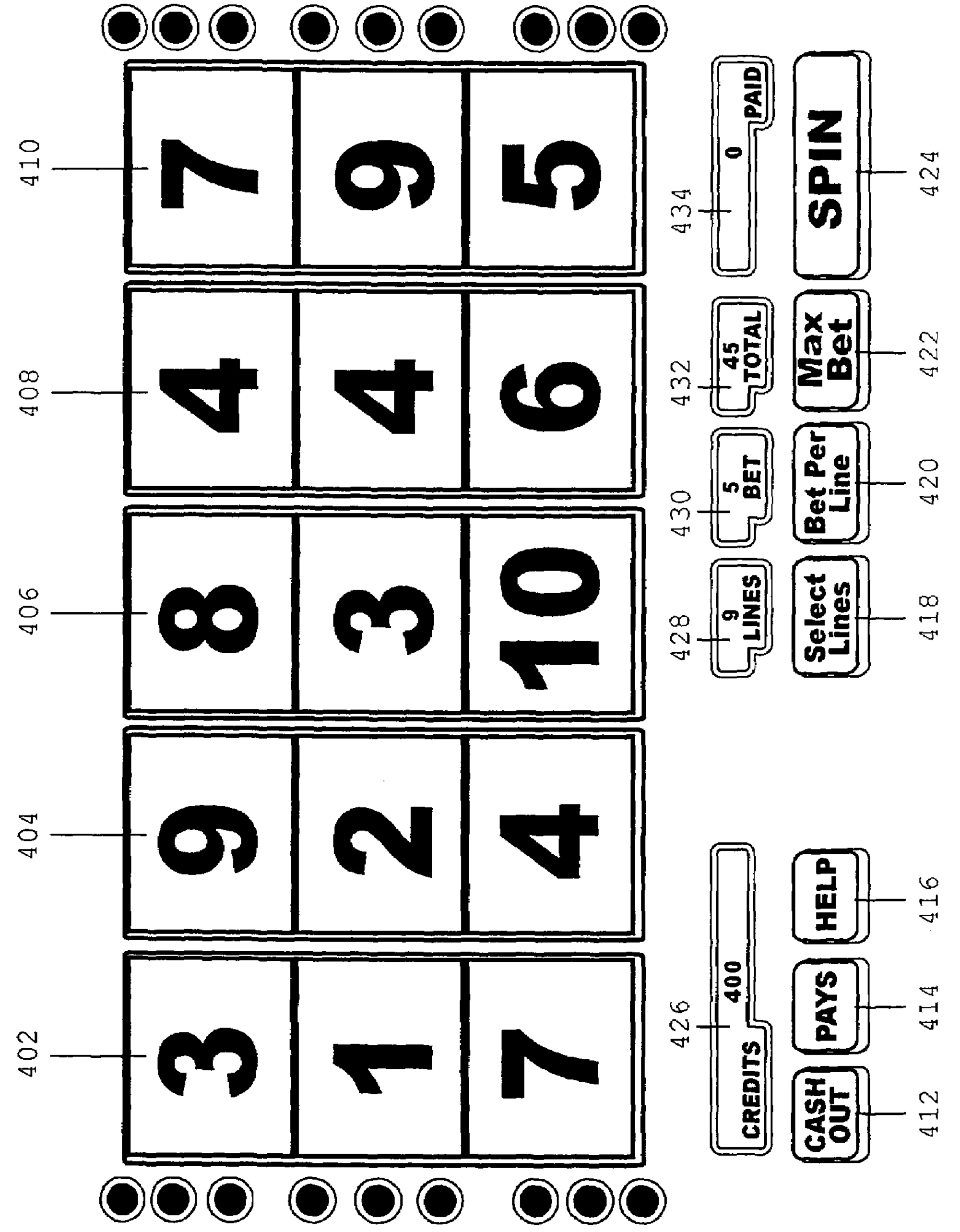

Video Display. FIG. 4*a* shows the base game screen, including five-reel display using a 5-column by 3-row symbol matrix 402-410. The first column 402, second column 404, third column 406, fourth column 408 and fifth column 410 all hold three symbols. Alternatively, the game could utilize any number of columns and reels, such as a 3-column by 3-row symbol matrix.

Buttons. FIG. 4*a* shows a set of control buttons 412-424 on the base game screen used by the player to control the functions of the slot game. These buttons include Cash Out 412, Pay Table 414, Help 416, Select Pay Lines 418, Bet Per Line 420, Max Bet 422 and Spin 424. Any or all of these control buttons may be displayed on the video display and/or buttons hard wired to the gaming device. If necessary, any number of buttons may be added to further facilitate control of the games.

Meters. FIG. 4*a* shows a set of meters 426-434 on the base game screen used to display the salient information for the game, including Credits 426, Number of Pay Lines 428 Amount Bet Per Line 430, Total Bet 432, and Paid 434:

The Credits meter 426 displays the total number credits remaining in the credit pool.

The Number of Pay Lines meter 428 is associated with the Select Pay Lines button and displays the current number of Pay Lines Selected.

The Amount Bet Per Line 430 meter is associated with the Bet Per Line button 420 and displays the number of credits wagered per pay line.

The Total Bet 432 meter displays the cumulative value of the Number of Pay Lines 428 and Amount Bet Per Line 430.

The Paid meter 434 displays the number of credits won on the last spin.

Credit Pool. FIG. 4*a* shows the number of credits in the credit pool, as displayed on the Credits meter 426. The pool of credits increases and decreases according to the player's wins or losses and may be supplemented, if necessary, by the player by additional deposits of coins, tokens or paper currency.

Figure 5:
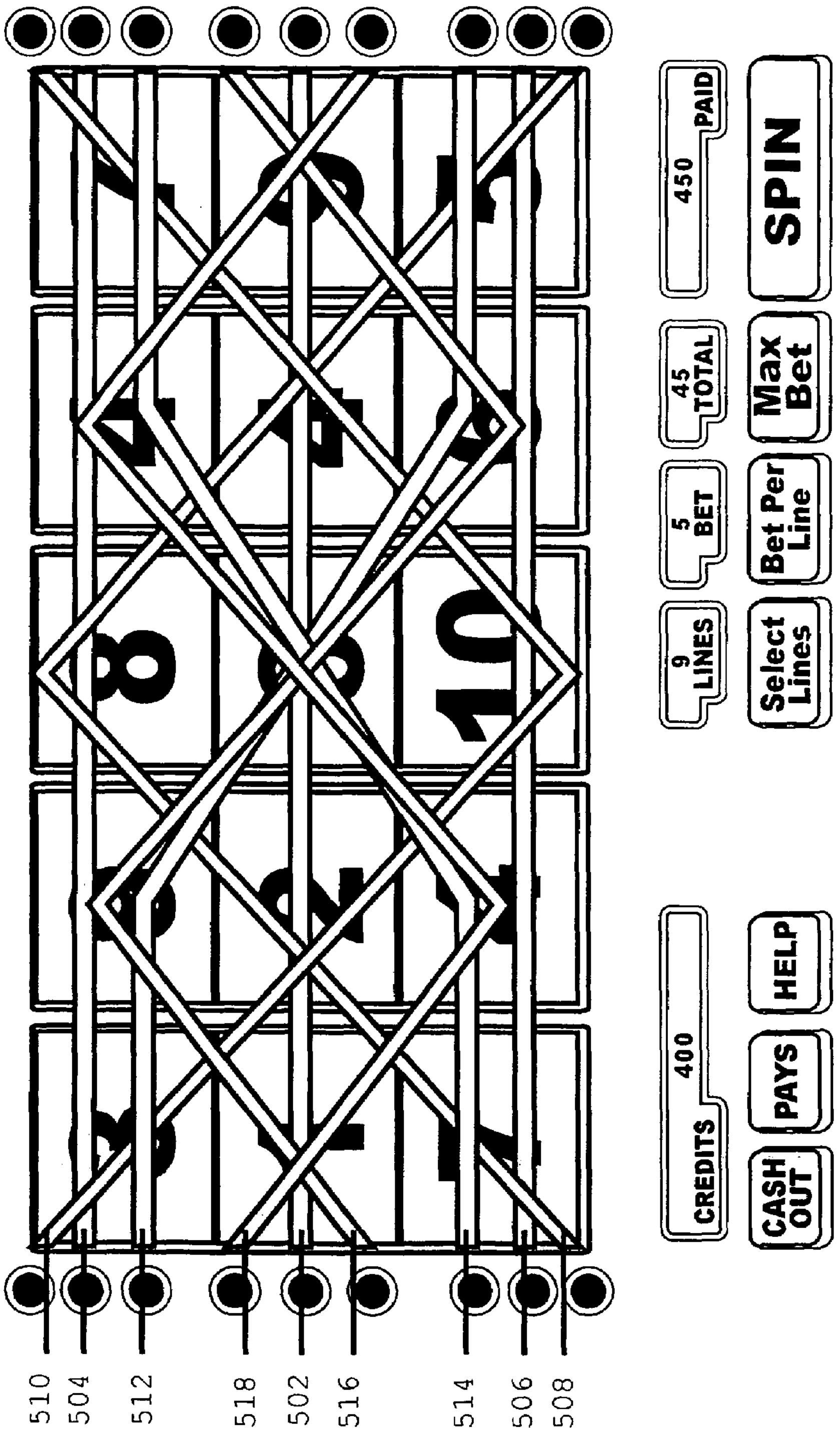
FIG. 5 illustrates the player-selected pay lines.

Select Pay Lines. FIG. 4*a* shows the number of pay lines upon which the player wagered, as displayed on the Number of Pay Lines meter 428. More specifically, FIG. 5 shows the location of the pay lines 502-518. The pay lines activate in a predetermined order, as follows:

The first wager is applied to pay line 1 at 502;
The second wager is applied to pay line 2 at 504;
The third wager is applied to pay line 3 at 506;
The fourth wager is applied to pay line 4 at 508;
The fifth wager is applied to pay line 5 at 510;
The sixth wager is applied to pay line 6 at 512;
The seventh wager is applied to pay line 7 at 514;
The eighth wager is applied to pay line 8 at 516; and
The ninth wager is applied to pay line 9 at 518.

However, the games may have fewer or greater than nine pay lines and utilize any order of pay line activation.

Bet Per Line. FIG. 4*a* shows the number of credits in wagered on each pay line, as displayed on the Bet Per Line meter 430. The same amount is wagered on each pay line. Alternatively, the player could be allowed to make wagers of different amounts on each pay line. The total amount wagered is determined by summing the amounts wagered on each pay line.

Total Bet. FIG. 4*a* shows the total number of credits bet on all of the pay lines, as displayed on the Total Bet meter 432. The total bet is calculated by multiplying the value of the Number of Pay Lines meter 428 by the Bet Per Line meter 430.

Symbol Set. For each spin, the machine randomly displays three symbols from the symbol set on each of the slot reels. Each of the symbols belongs to one of three groups: base symbols, scatter symbols, "stop" symbols, and wild symbols:

Base Symbols—Base symbols provide line pays for three or more same symbols appearing adjacent to each other on an active pay line, from the leftmost pay line position towards the right.

Scatter Symbols—Scatter symbols provide scatter pays for any one or more scatter symbols appearing anywhere on a pay line (line-scatter pay) or anywhere on the slot reels (reel-scatter pay).

Stop Symbols—Stop symbols prevent re-spinning of the reel upon which the stop symbol appears. The symbol positions in "stopped" reels will not re-spin; the symbol positions in the "unlocked" reels, however, will re-spin. Further, stop symbols neither form any line or scatter pays nor act as wild symbols.

Wild Symbols—Wild symbols replace as any base symbol to help form winning combinations on active pay lines.

Figure 4B:
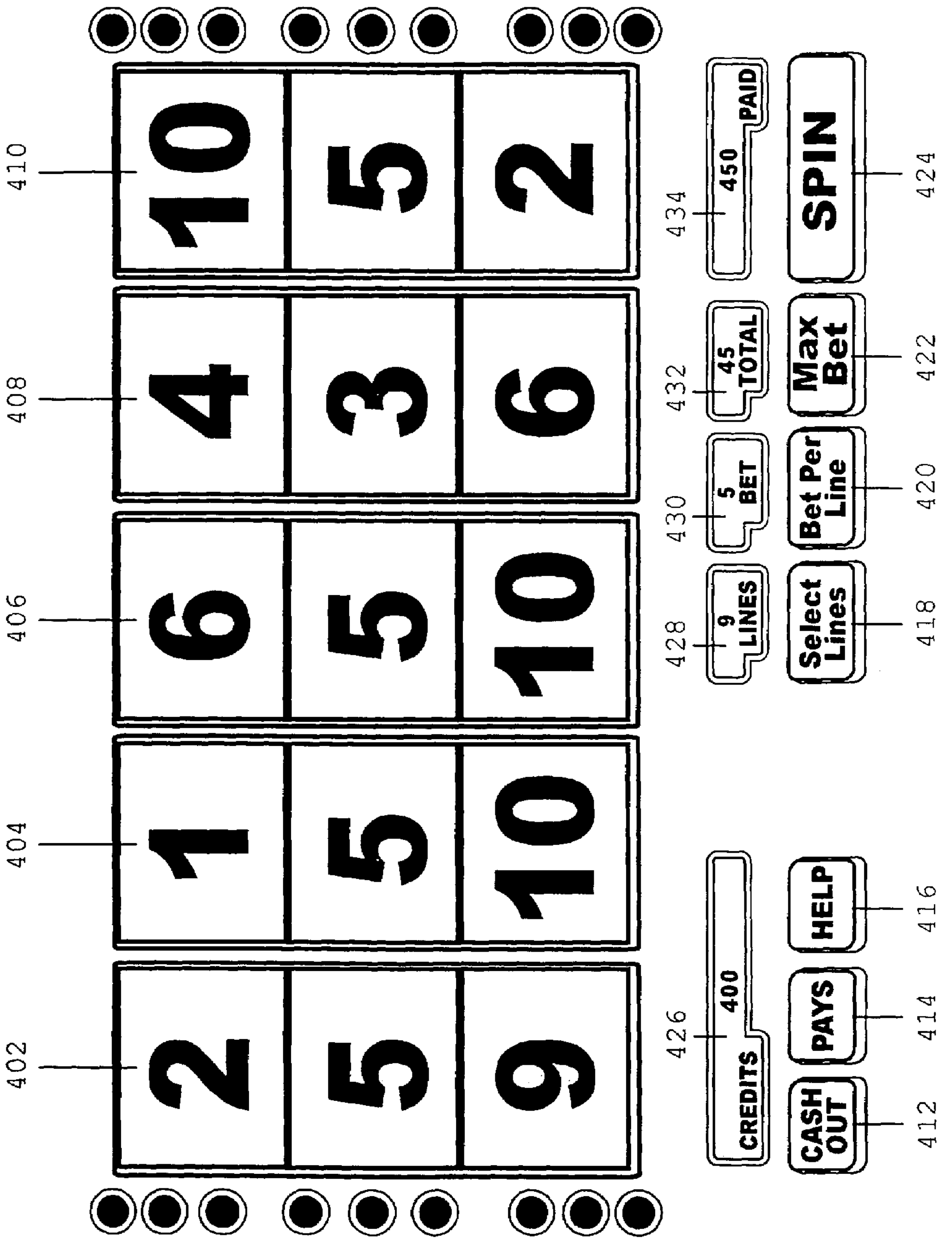

Winning Symbol Combinations. FIGS. 4*a*-4*l* show different types of winning symbol combinations, including line pays, line scatter pays, reel scatter pays, and line pays using wild symbols, as follows:

FIG. 4*b* shows a line pay of three "5" symbols on the slot reels 402, 404 and 406.

Figure 4C:
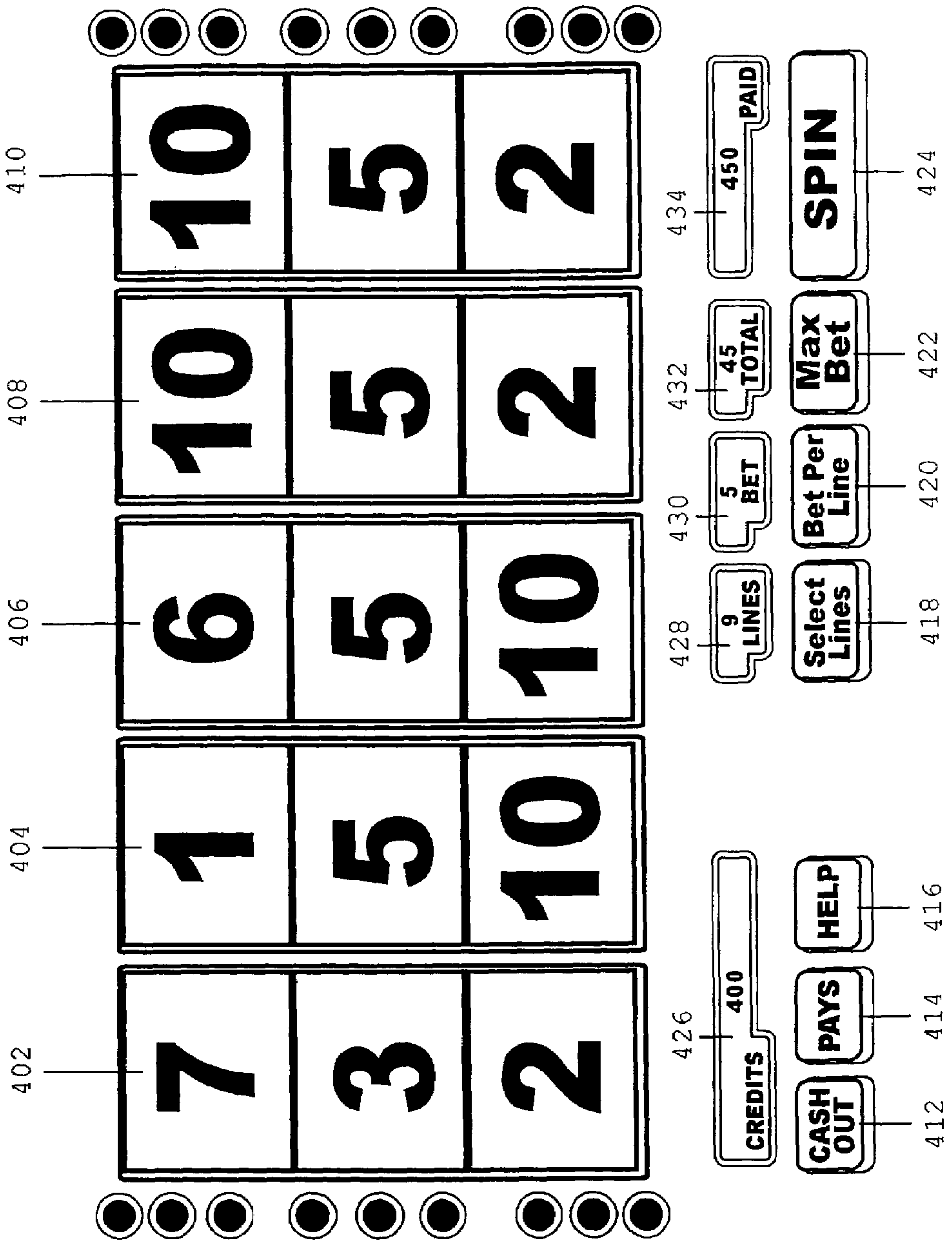
Figure 4D:
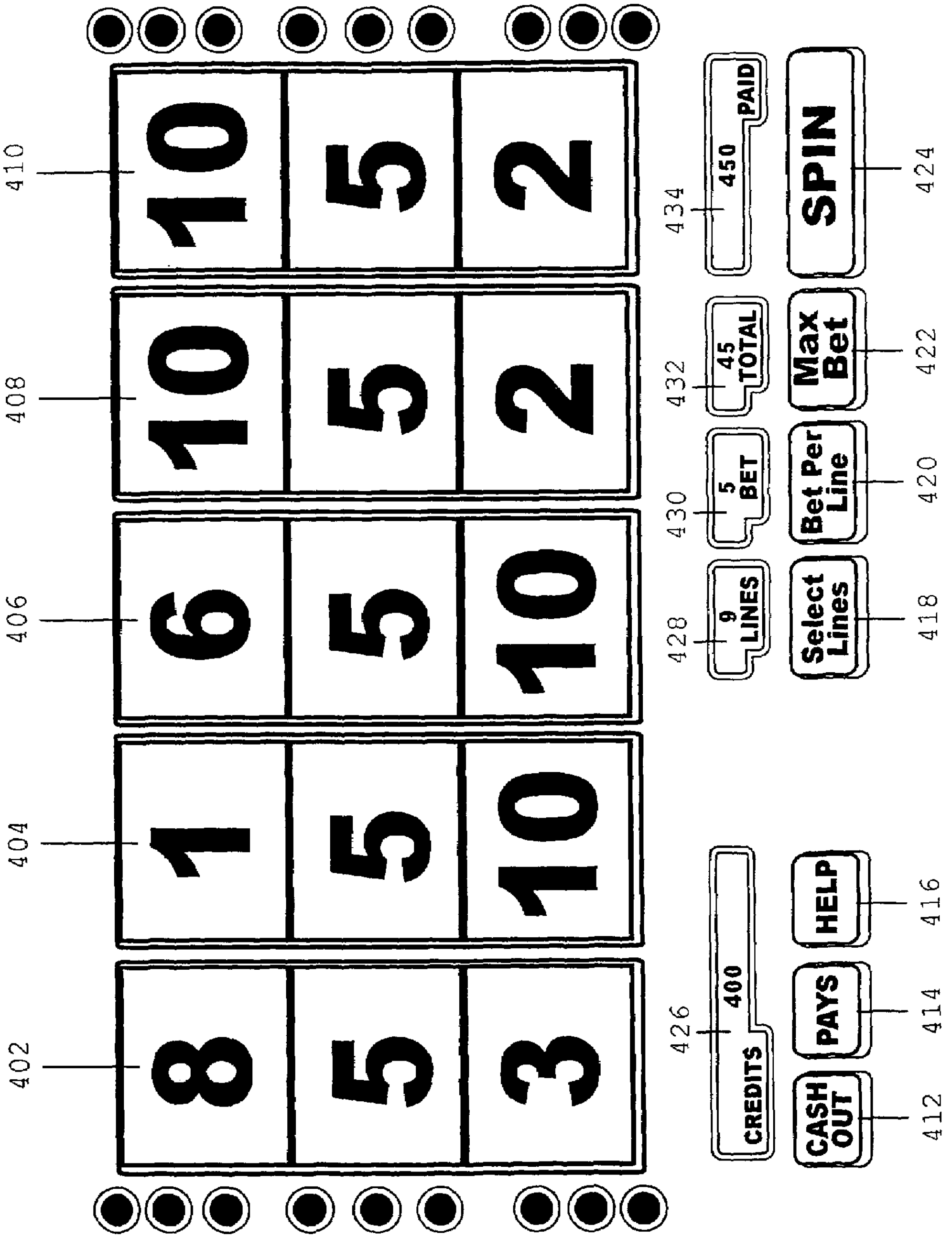

FIG. 4*d* shows a line pay of five "5" symbols on the slot reels 402, 404, 406, 408, and 410.

Figure 4E:
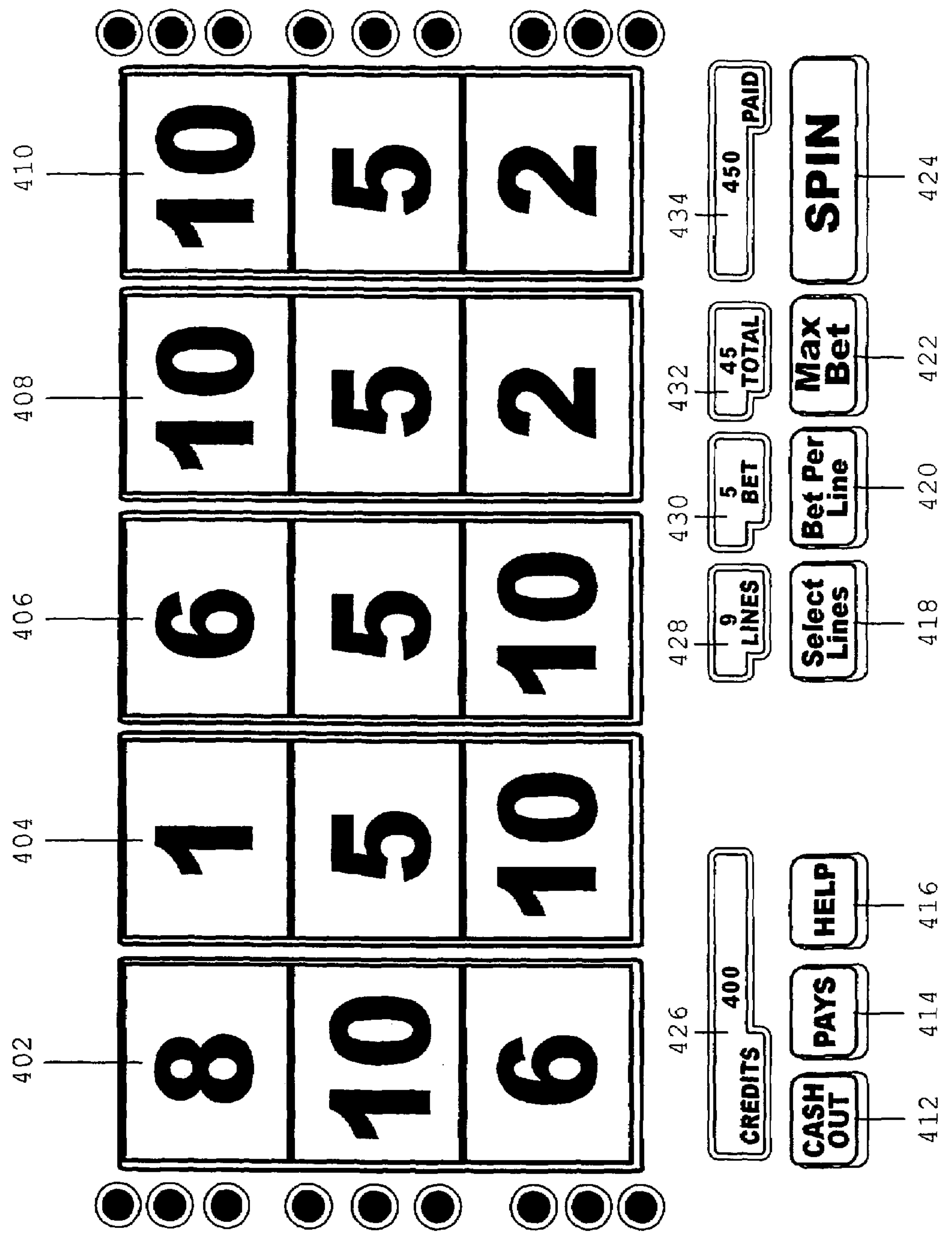
Figure 4F:
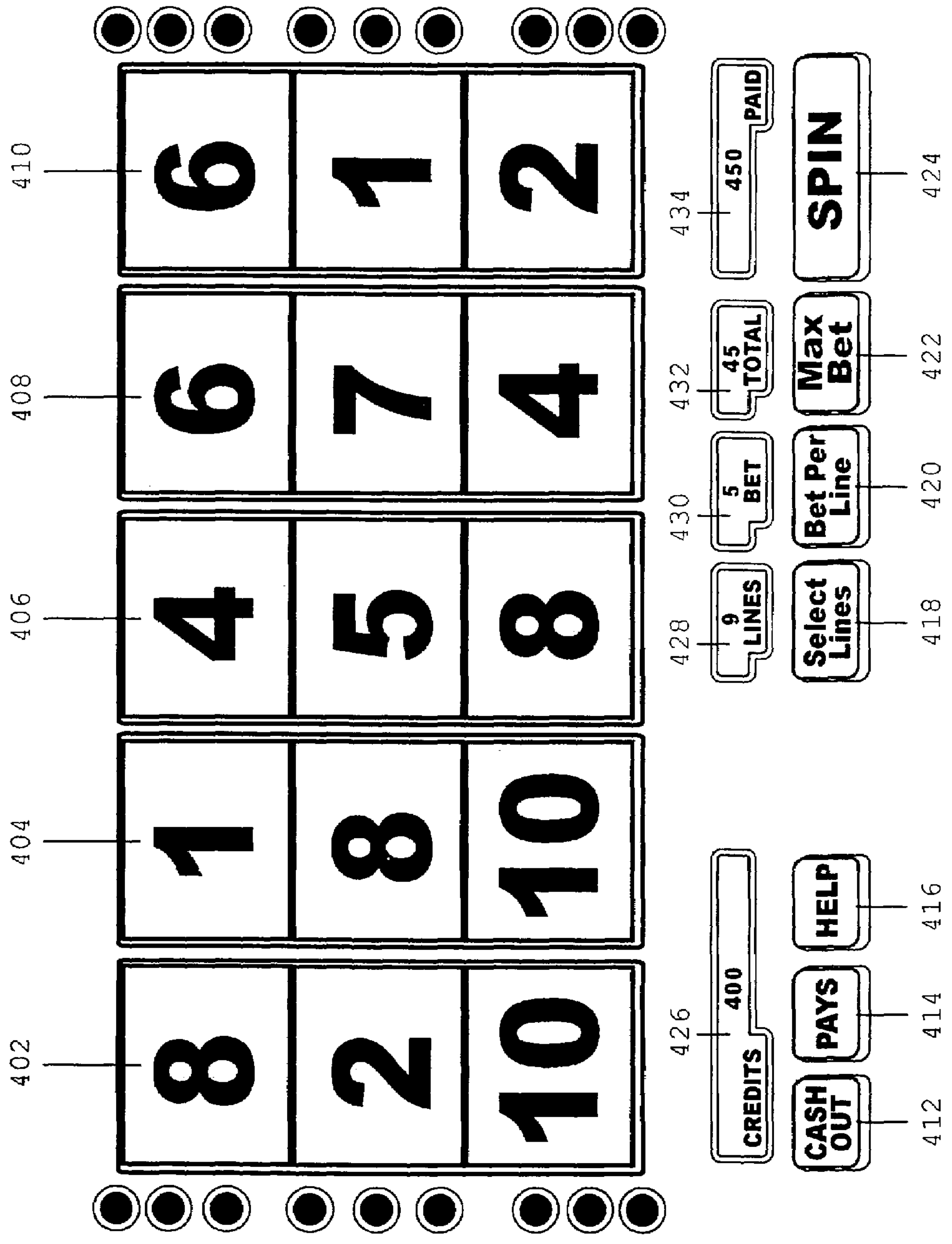

FIG. 4*f* shows a line pay of three "8" symbols on the slot reels 402, 404, and 406.

Figure 4G:
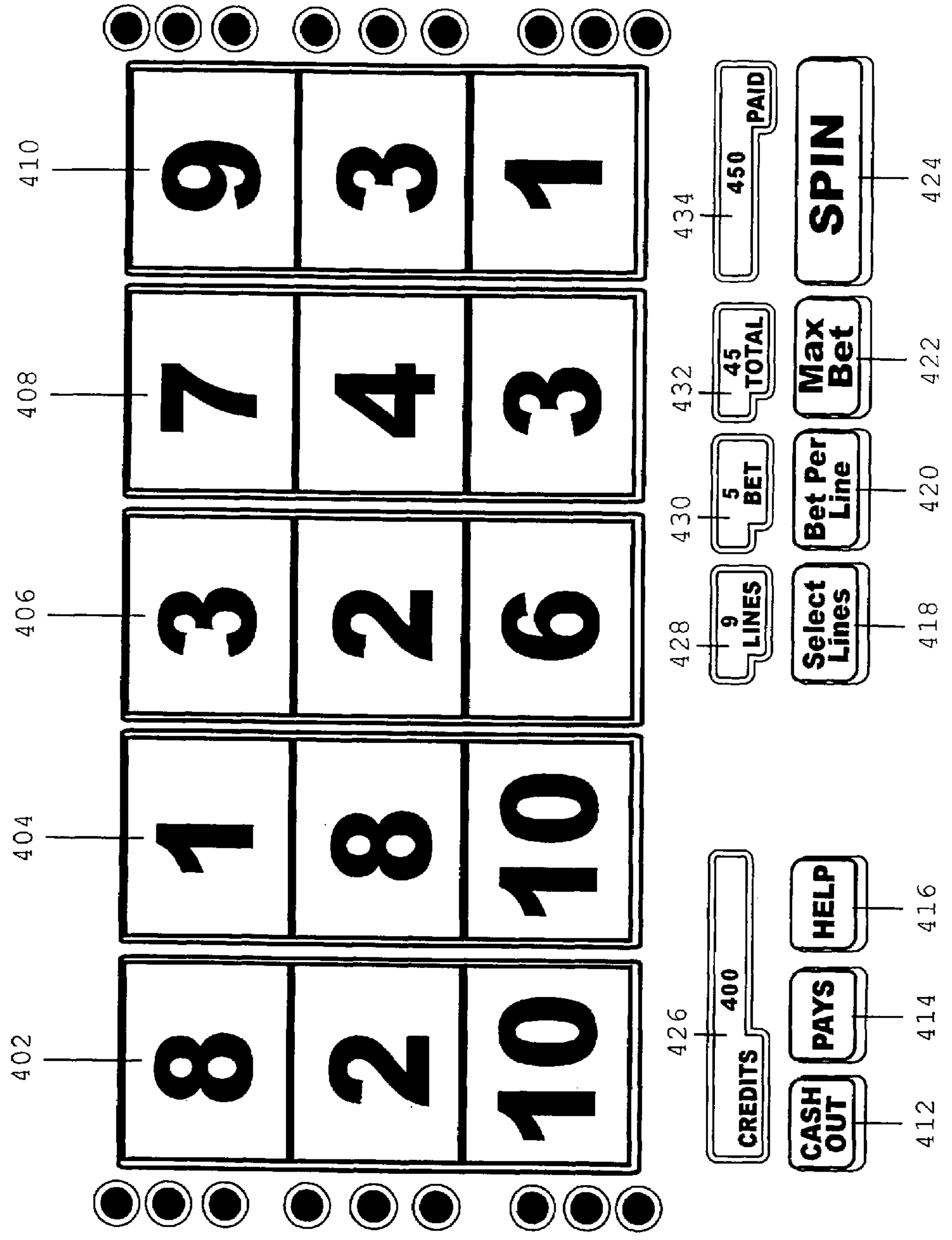

FIG. 4*g* shows a line pay of two "8" symbols on the slot reels 402 and 404.

Figure 4H:
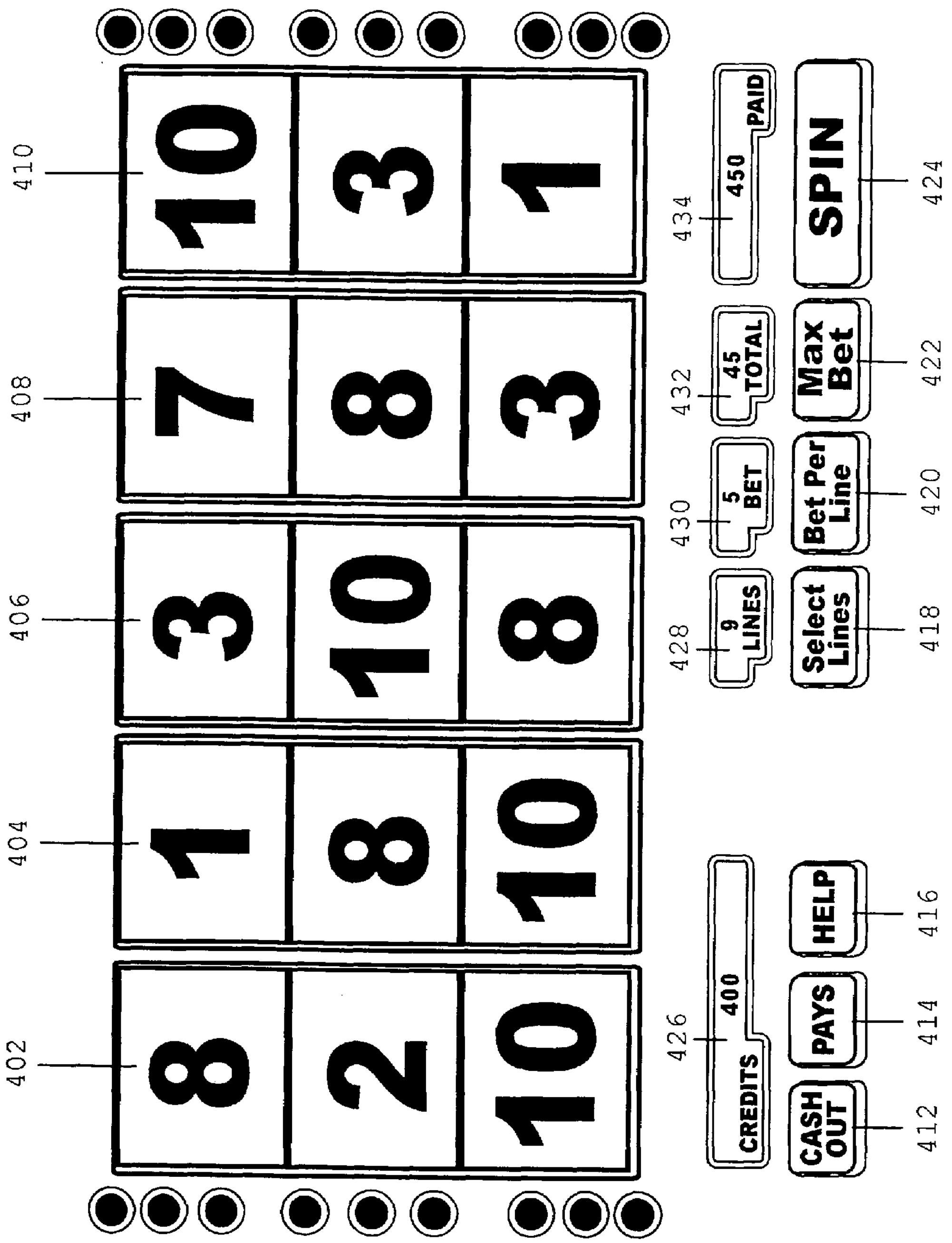

FIG. 4*h* shows a line pay of four "8" symbols on the slot reels 402, 404, 406, and 408.

Figure 4I:
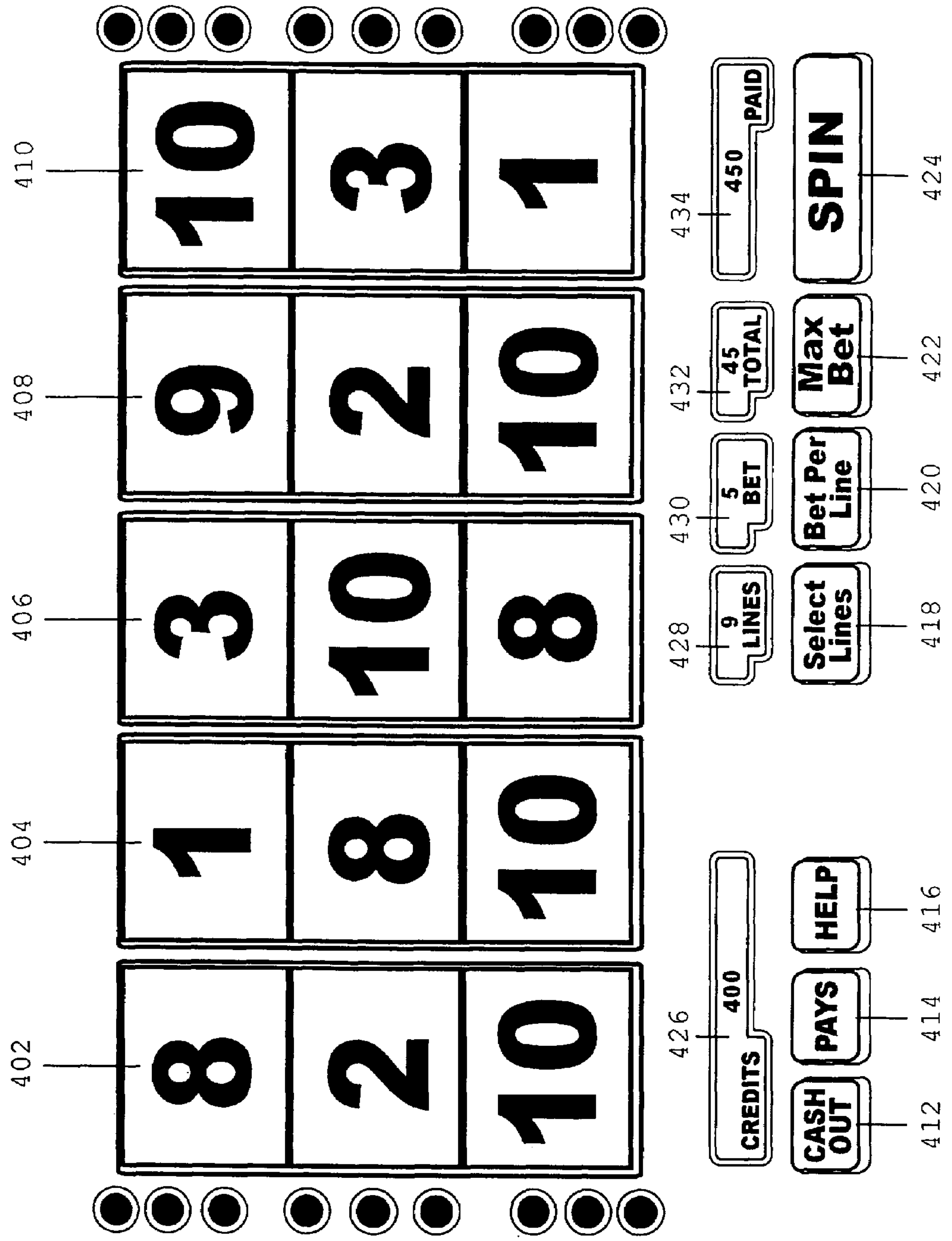

FIG. 4*i* shows a line pay of three "8" symbols on the slot reels 402, 404, 406, 408 and 410.

Figure 4J:
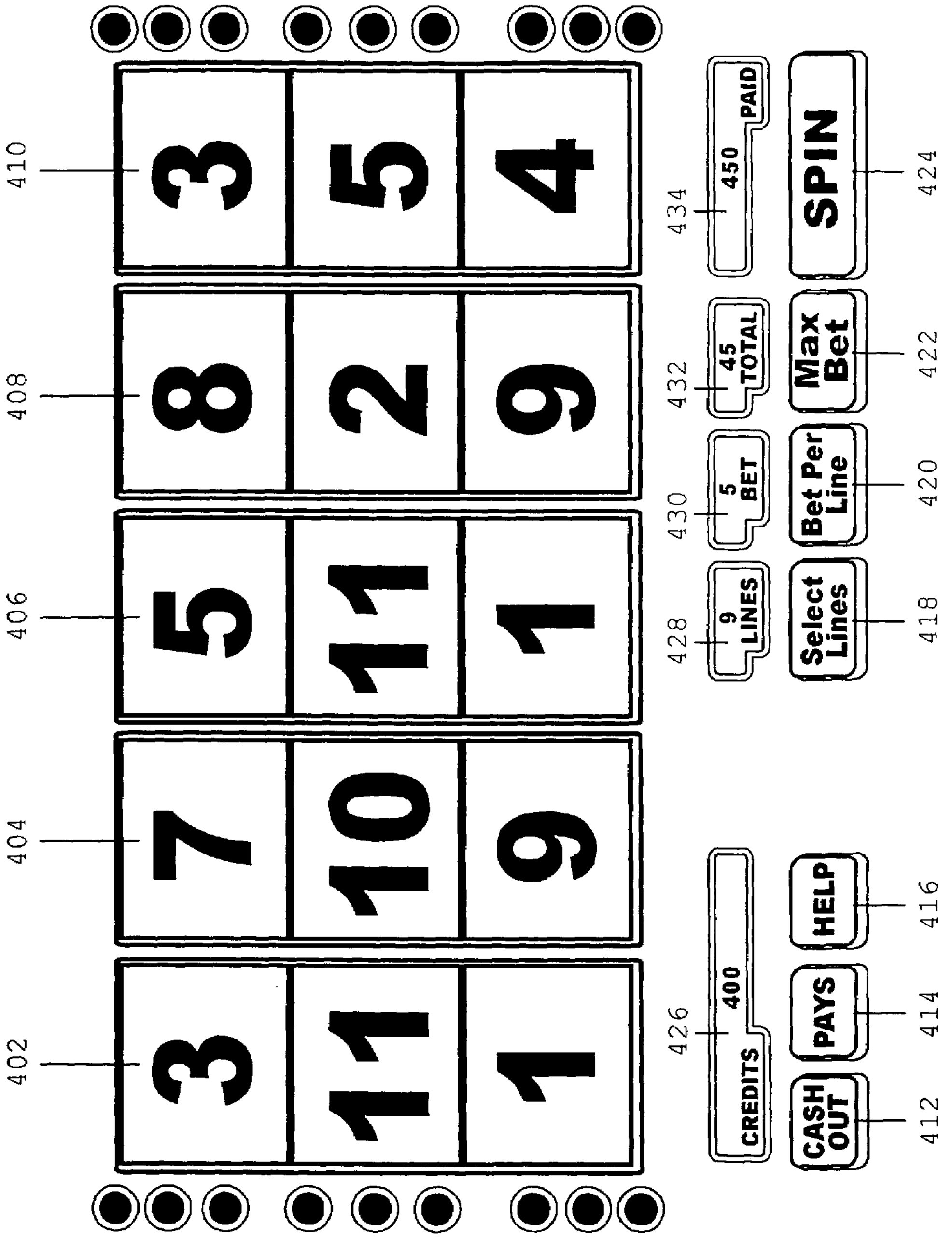

FIG. 4*j* shows a line-scatter pay of two "11" symbols on pay line 1, at slot reels 402 and 406.

Figure 4K:
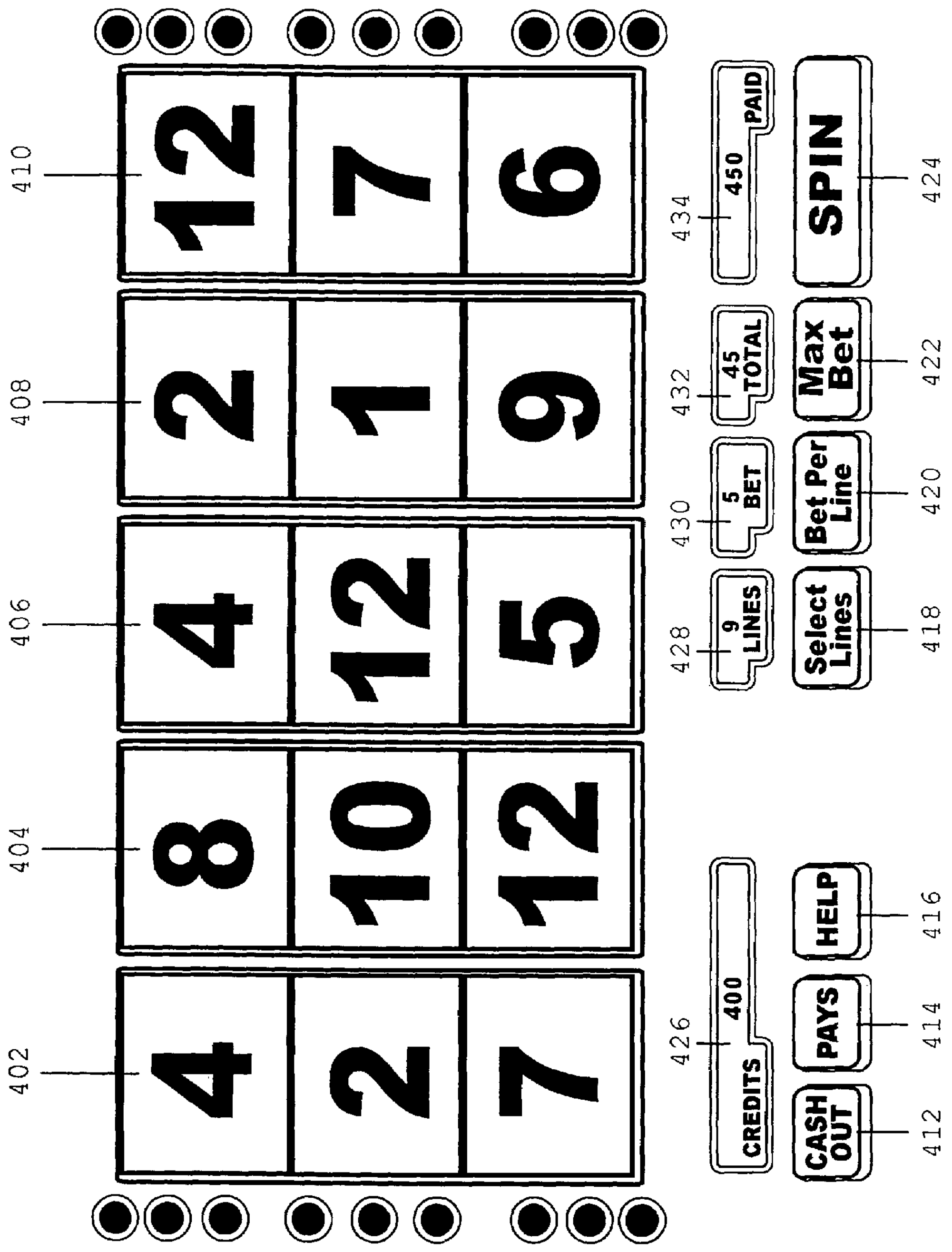
Figure 41:
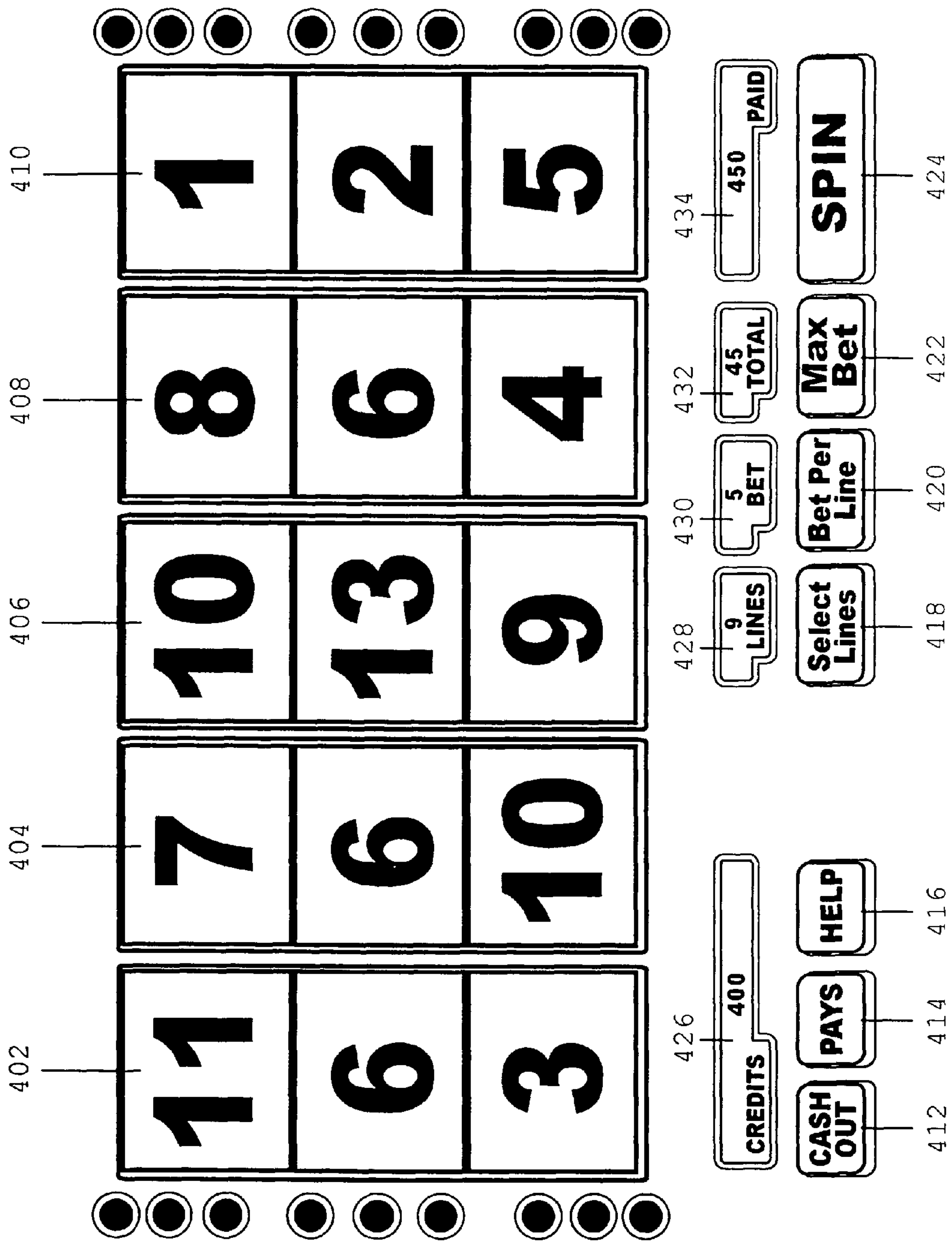

FIG. 4*k* shows a reel-scatter pay of three "12" symbols on slot reels 404,406, 410.

FIG. 4*l* shows a (wild) line pay of four "6" symbols, with three "6" symbols on slot reels 402, 404, and 408 and one wild symbol on slot reel 406.

Alternatively, any pre-determined arrangement of symbols may be designated as winning symbol combinations.

Re-Spin & Re-Pay. FIGS. 4*a*-4*l* show examples of awards issued for winning combinations appearing on initial spins and subsequent re-spins.

FIGS. 4*b*-4*e* show an initial spin followed by three subsequent re-spins:

FIG. 4*b* shows the initial spin; the game issues a line pay award for three "5" symbols on the slot reels 402, 404 and 406 and displays "stop" symbols on reels 404, 406 and 410.

FIG. 4*c* shows the first re-spin; the game issues no awards and displays "stop" symbols on reels 404, 406, 408 and 410.

FIG. 4*d* shows the second re-spin; the game issues a line pay for five "5" symbols on the slot reels 402, 404, 406, 408, and 410 and displays stop symbols on reels 404, 406, 408 and 410.

FIG. 4*e* shows the third re-spin; the game issues no awards and displays stop symbols on reels 404, 406, 408 and 410. With all five reels stopped, there are no more re-spins and the game ends.

FIGS. 4*f*-4*i* show another initial spin followed by three subsequent re-spins:

FIG. 4*f* shows an initial spin; the game issues a line pay for three "8" symbols on the slot reels 402, 404, and 406 and displays with stop symbols on reels 402 and 404.

FIG. 4*g* shows the first re-spin; the game issues a line pay for two "8" symbols on the slot reels 402 and 404 and displays stop symbols on reels 402 and 404.

FIG. 4*h* shows a second re-spin; the game issues a line pay for four "8" symbols on the slot reels 402, 404, 406, and 408 and displays stop symbols on reels 402, 404, 408 and 410.

FIG. 4*i* shows a third re-spin; the game issues a line pay for three "8" symbols on the slot reels 402, 404, and 406 and displays stop symbols on reels 402, 404, 406, 408 and 410. With all five reels stopped, there are no more re-spins and the game ends.

These initial spins and re-spins, along with any associated winning combinations and awards, are explained in more detail in the Base Game Example section below.

Base Game Example. Sam Slotsky is standing in front of a nickel-denomination version of the preferred embodiment of the present invention. Sam sees a 5-reel slot game on the video display using a 5-column by 3-row symbol matrix 402-410.

Below the video display, the button panel holds seven buttons: Cash Out 412, Pay Table 414, Help 416, Select Pay Lines 418, Bet Per Line 420, Bet Max 422, and Spin 424. In addition, there are also five meters on the video screen display below the game: Credits 426, Number of Pay Lines 428, Amount Bet Per Line 430, Total Bet 432 and Paid 434.

Sam presses the Pay Table button 414 to view the pays for winning combinations:

| | | | |
|---|---|---|---|
| 9-9-9-9-9 . . . 10000 | 9-9-9-9 . . . 400 | 9-9-9 . . . 200 | 9-9 . . . 5 |
| 8-8-8-8-8 . . . 500 | 8-8-8-8 . . . 200 | 8-8-8 . . . 100 | 8-8 . . . 4 |
| 7-7-7-7-7 . . . 240 | 7-7-7-7 . . . 120 | 7-7-7 . . . 60 | 7-7 . . . 3 |
| 6-6-6-6-6 . . . 160 | 6-6-6-6 . . . 80 | 6-6-6 . . . 40 | 6-6 . . . 2 |
| 5-5-5-5-5 . . . 100 | 5-5-5-5 . . . 50 | 5-5-5 . . . 25 | |
| 4-4-4-4-4 . . . 40 | 4-4-4-4 . . . 20 | 4-4-4 . . . 10 | |
| 3-3-3-3-3 . . . 40 | 3-3-3-3 . . . 20 | 3-3-3 . . . 10 | |
| 2-2-2-2-2 . . . 20 | 2-2-2-2 . . . 10 | 2-2-2 . . . 5 | |
| 1-1-1-1-1 . . . 20 | 1-1-1-1 . . . 10 | 1-1-1 . . . 5 | |

Sam deposits $20 into the bill receptor and the Credits meter 426 counts up from 0 to 400 since the denomination for this game is five cents per credit. Sam then his chooses the wager for the game:

The game's Number of Pay Lines meter 428 reads 1. Sam presses the Select Pay Lines button 418 four times and the Number of Pay Lines meter 428 counts up from 1 to 5. As Sam presses the Select Pay Lines button 418, the video display shows the locations of each selected pay line on the 5-column by 3-row matrix 402-410. For example, the first pay line 502 starts in the middle row of the first column and proceeds in the straight line through the middle row of columns 2 through 5;

The game's Amount Bet Per Line meter 430 reads 1. Sam presses the Bet Per Line button 420 two times and the Amount Bet Per Line meter 430 counts up from 1 to 3;

The Total Bet meter 432 started at 1, but after Sam's adjustments it now reads 15; and The Paid meter 434 reads 0.

After setting his wager, Sam presses the spin button 424. The Credits meter 426 counts down from 400 to 385. The slot reels 402-410 spin and then come to a stop. For example, using the numbers 1 to 9 to represent the symbol set, 10 as "stop" symbol, 11 as line-scatter symbol, 12 as reel-scatter symbol and 13 as wild symbol, on reels 1 through 5:

Initial Spin (as Shown in FIG. 4*b*)

| Reel: | | | | |
|---|---|---|---|---|
| 1 | 2 | 3 | 4 | 5 |
| 2 | 1 | 6 | 4 | *10* |
| **5** | **5** | **5** | 3 | 5 |
| 9 | *10* | *10* | 6 | 2 |

(Winning combination in bold.)
(Stop symbols in *italics*.)

The game awards Sam a total of credits for the winning symbol combination of 5-5-5 on pay line 1 at 502. According to the game's pay table, the 5-5-5 combination pays 25 credits for each credit wagered upon the pay line; or 25 credits times three credits wagered by Sam on pay line 1 at 502 for a total of 75.

With stop symbols displayed on reels 2, 3, and 5, the game re-spins reels 1 and 4, as follows:

Re-Spin 1 (as Shown in FIG. 4*c*)

| Reel: | | | | |
|---|---|---|---|---|
| 1 | 2 | 3 | 4 | 5 |
| 7 | 1 | 6 | *10* | *10* |
| 3 | 5 | 5 | 5 | 5 |
| 2 | *10* | *10* | 2 | 2 |

(Stop symbols in *italics*.)

The game awards no credits since there is no winning symbol combination. With stop symbols displayed on reels 2, 3, 4, and 5, the game re-spins reel 1, as follows:

Re-Spin 2 (as Shown in FIG. 4*d*)

| Reel: | | | | |
|---|---|---|---|---|
| 1 | 2 | 3 | 4 | 5 |
| 8 | 1 | 6 | *10* | *10* |
| **5** | **5** | **5** | **5** | **5** |
| 3 | *10* | *10* | 2 | 2 |

(Winning combination in bold.)
(Stop symbols in *italics*.)

The game awards Sam a total of 300 credits for the winning symbol combination of 5-5-5-5-5 on pay line 1 at 502. According to the game's pay table, the 5-5-5-5-5 combination pays 100 credits for each credit wagered upon the pay line; or 100 credits times three credits wagered by Sam on pay line 1 at 502 for a total of 300.

With stop symbols displayed on reels 2, 3, 4, and 5, the game again re-spins reel 1, as follows:

Re-Spin 3 (as Shown in FIG. 4*e*)

| Reel: | 1 | 2 | 3 | 4 | 5 |
|---|---|---|---|---|---|
| | 8 | 1 | 6 | *10* | *10* |
| | *10* | 5 | 5 | 5 | 5 |
| | 6 | *10* | *10* | 2 | 2 |

(Stop symbols in italics.)

The game awards no credits since there is no winning symbol combination. With stop symbols displayed on all of the reels, the game ends and the player receives the cumulative value of all awards or 375 credits. Thus, the Credits meter counts up from 385 to 760 and the game Paid meter 434 reads 375.

Again, Sam presses the spin button 424. The Credits meter 426 counts down from 760 to 745. The slot reels 402-410 spin and then come to a stop. For example, using the numbers 1 to 9 to represent the symbol set, 10 as "stop" symbol, 11 as line-scatter symbol, 12 as reel-scatter symbol and 13 as wild symbol, on reels 1 through 5:

Initial Spin (as Shown in FIG. 4*f*)

| Reel: | | | | |
|---|---|---|---|---|
| 1 | 2 | 3 | 4 | 5 |
| **8** | 1 | 4 | 6 | 6 |
| 2 | **8** | 5 | 7 | 1 |
| *10* | *10* | **8** | 6 | 2 |

(Winning combination in bold.)
(Stop symbols in *italics*.)

The game awards Sam a total of 300 credits for the winning symbol combination of 8-8-8 on pay line 5 at 510. According to the game's pay table, the 8-8-8 combination pays 100 credits for each credit wagered upon the pay line; or 100 credits times three credits wagered by Sam on pay line 5 at 510 for a total of 300.

With stop symbols displayed on reels 1 and 2, the game re-spins reels 3, 4, and 5, as follows:

Re-Spin 1 (as Shown in FIG. 4*g*)

| Reel: | | | | |
|---|---|---|---|---|
| 1 | 2 | 3 | 4 | 5 |
| **8** | 1 | 3 | 7 | 9 |
| 2 | **8** | 2 | 4 | 3 |
| *10* | *10* | 6 | 3 | 1 |

(Winning combination in bold.)
(Stop symbols in *italics*.)

The game awards Sam a total of 12 credits for the winning symbol combination of 8-8 on pay line 5 at 510. According to the game's pay table, the 8-8 combination pays 4 credits for each credit wagered upon the pay line; or 4 credits times three credits wagered by Sam on pay line 5 at 510 for a total of 12.

With stop symbols displayed on reels 1 and 2, the game re-spins reels 3, 4, and 5, as follows:

Re-Spin 2 (as Shown in FIG. 4*h*)

| Reel: | | | | |
|---|---|---|---|---|
| 1 | 2 | 3 | 4 | 5 |
| **8** | 1 | 3 | 7 | *10* |
| 2 | **8** | *10* | **8** | 3 |
| *10* | *10* | **8** | 3 | 1 |

(Winning combination in bold.)
(Stop symbols in *italics*.)

The game awards Sam a total of 600 credits for the winning symbol combination of 8-8-8-8 on pay line 5 at 510. According to the game's pay table, the 8-8-8-8 combination pays 200 credits for each credit wagered upon the pay line; or 200 credits times three credits wagered by Sam on pay line 5 at 510 for a total of 600.

With stop symbols displayed on reels 1, 2, 3, and 4, the game again re-spins reel 5, as follows:

Re-Spin 3 (as Shown in FIG. 4*i*)

| Reel: | | | | |
|---|---|---|---|---|
| 1 | 2 | 3 | 4 | 5 |
| **8** | 1 | 3 | 9 | *10* |
| 2 | **8** | *10* | 2 | 3 |
| *10* | *10* | **8** | *10* | 1 |

(Winning combination in bold.)
(Stop symbols in *italics*.)

The game awards Sam a total of 300 credits for the winning symbol combination of 8-8-8 on pay line 5 at 510. According to the game's pay table, the 8-8-8 combination pays 100 credits for each credit wagered upon the pay line; or 100 credits times three credits wagered by Sam on pay line 5 at 510 for a total of 300.

With stop symbols displayed on all of the reels 402-410, the game ends and the player receives the cumulative value of all awards or 1212 credits. Thus, the Credits meter 426 counts up from 745 to 1957 and the game Paid meter 434 reads 1212.

Content with his winnings, Sam presses the Cash Out button 412. The gaming device issues 1957 nickels or any other form of currency, including cash, an EZ-PAY™ ticket, or electronic payment.

Additional Features. During play of the base game, the player may receive pays for additional features, such as scatter pays and wild symbols.

Scatter Pays. FIGS. 4*j* and 4*k* show scatter pays that award the player a predetermined payout for the appearance of scatter symbols on the slot reels:

FIG. 4*j* shows a "line scatter pay" that issues awards for scatter symbols "11" on pay line 1 at 502; and FIG. 4*k* shows a "reel scatter pay" that issues awards for scatter symbols "12" anywhere on the slot reels 402-410.

The Scatter pays illustrated in FIG. 4*j* or 4*k* issue a specific number of credits. The credits may be issued immediately or after the completion of a bonus feature (i.e.

animation sequence or animated bonus game). The calculation of the scatter pay award depends on the type of scatter pay:

For the line scatter pay in FIG. 4*j*, the number of credits wagered on the winning pay line multiplies the number of credits indicated by the pay table. For example, a player may wager two credits each on five pay lines, spin the reels, and collect twice the amount indicated on the pay table for a line scatter pay appearing on any of the five played pay lines.

For the reel scatter pay in FIG. 4*k*, the total number of credits wagered multiplies the number of credits indicated by the pay table. For example, a player may wager ten total credits, spin the reels, and collect ten times the amount indicated on the pay table for a reel scatter pay appearing on anywhere on the slot reels.

In a preferred embodiment of the present invention, there are scatter pays for symbol 11 and symbol 12, as follows:

11 Symbol Award Schedule
1—"11" anywhere on a pay line pays 1× line bet
2—"11"s anywhere on a pay line pays 2× line bet
3—"11"s anywhere on a pay line pays 3× line bet
4—"11"s anywhere on a pay line pays 30× line bet
5—"11"s anywhere on a pay line pays 300× line bet 12 Symbol Award Schedule
3—"12"s anywhere on the reels pays 10× total bet
4—"12"s anywhere on the reels pays 100× total bet
5—"12"s anywhere on the reels pays 1000× total bet Alternatively, any pre-determined arrangement of scatter symbols—line-scatter and/or reel-scatter—may be designated as winning symbol combinations, with any associated award amounts.

Wild Symbols. FIG. 4*l* shows how a wild symbol is used to replace any or all other symbols to form winning symbol combinations:

FIG. 4*l* shows a line pay of three "6"s on slot reels 402, 404, 408 and one wild symbol on slot reel 406.

In this example, the wild symbol acts as a "6" symbol to help form a winning 6-6-6-6 symbol combination. The preferred embodiment allows the wild symbol may replace any base symbol, but may not replace a scatter or stop symbol. Alternatively, wild symbols may replace all symbols, only scatter symbols, or any other limited sub-set of the symbols.

Having thus described our invention, what we claim as new and desire to secure by Letters Patent is as follows:

1. A method of playing a game using a symbol matrix formed by a plurality of rows intersecting with a plurality of columns, with the plurality of rows and columns defining a plurality of symbol positions, comprising:

a) optionally placing a wager to play the game;
b) randomly generating symbols for each symbol position in the symbol matrix;
c) displaying the symbols generated for each symbol position in the symbol matrix;
d) issuing awards for winning symbol combinations displayed in the symbol matrix;
e) setting the status of each symbol position as either "locked" or "unlocked";
f) if any symbol positions are unlocked, repeating the following steps until all symbol positions are locked:
   1) randomly generating symbols for each unlocked symbol position;
   2) displaying the symbols generated for each unlocked symbol position; and
   3) issuing awards for winning symbol combinations displayed in the symbol matrix.

2. A method of claim 1, wherein the awards issue based upon at least one of the following winning symbol combinations:

a) pre-determined combinations of symbols appearing contiguously in a pre-determined group of symbol positions in the symbol matrix;
b) pre-determined combinations of symbols appearing anywhere in a pre-determined group of symbol positions in the symbol matrix; and
c) pre-determined combinations of symbols appearing in any symbol positions in the symbol matrix.

3. A method of claim 1, wherein the awards issue based upon at least one of the following winning symbol combinations:

a) pre-determined combinations of symbols appearing contiguously on a pay line;
b) pre-determined combinations of symbols appearing anywhere on a pay line; and
c) pre-determined combinations of symbols appearing anywhere in the symbol matrix.

4. A method of claim 1, wherein the type of awards may change during the game.

5. A method of claim 1, wherein the type of awards may change during the game, with the initial spin and/or subsequent re-spins issuing at least one of the following award types:

a) credits valid for at least one of any purpose, limited purposes, specific purpose, and redemption according to any conversion rate;
b) free games that may be played at no cost to the player;
c) currency in at least one of any paper or coin form, denomination, and nationality;
d) prizes of at least one of any value, shape, size, description, and distributed according to any delivery schedule; and
e) services of any value, duration, description, and/or provided according to any performance schedule.

6. A method of claim 1, wherein the amount of awards may change during the game.

7. A method of claim 1, wherein the amount of awards may change during the game, with the initial spin and/or subsequent re-spins changing award values using any of the following methods:

a) increasing or decreasing some or all awards listed in the pay schedule by a fixed amount;
b) increasing or decreasing some or all awards listed in the pay schedule by a random amount;
c) increasing or decreasing some or all awards listed in the pay schedule by a multiplicative factor; and/or
d) increasing or decreasing some or all awards listed in the pay schedule in response to player input;
e) adding or subtracting winning symbol combinations and associated awards from the pay schedule.

8. A method of claim 1(e), wherein the symbol positions are "locked" by the appearance of one or more pre-determined symbols in the symbol matrix.

9. A method of claim 1(e) in which symbol positions are "locked" by at least one of the following methods:

a) the appearance of one or more pre-determined symbols "locks" those symbol positions in which the pre-determined symbols appeared;
b) the appearance of one or more pre-determined symbols in a column "locks" all of the symbol positions in that column;

c) the appearance of one or more pre-determined symbols in a row "locks" all of the symbol positions in that row;

d) the appearance of one or more pre-determined symbols in the symbol matrix "locks" all of the symbol positions in the symbol matrix;

e) the appearance of one or more pre-determined symbols in a symbol position "locks" all of the symbol positions adjacent to that symbol position;

f) the appearance of one or more pre-determined symbols in a column "locks" all of the symbol positions above or below the pre-determined symbol(s);

g) the appearance of one or more pre-determined symbols in a row "locks" all of the symbol positions to the right or left of the pre-determined symbol(s);

h) the appearance of one or more pre-determined symbols in a pay line "locks" all of the symbol positions on that pay line; and i) the appearance of one or more pre-determined symbols in a pay line "locks" all of the symbol positions before or after the pre-determined symbol(s).

10. A method of claim 1(e) in which the status of each symbol position, as either "locked" or "unlocked", by the appearance of one or more winning combinations in the symbol matrix.

11. A method of claim 1(e) in which symbol positions are "locked" by at least one of the following methods:

a) a winning combination "locks" all of the symbol positions involved in that winning combination; and b) the appearance of a winning combination "locks" all of the symbol positions not involved that winning combination.

12. A method of claim 1(e) in which "locked" symbol positions are "unlocked" by the appearance of one or more pre-determined symbols in the symbol matrix.

13. A method of claim 1(e) in which "locked" symbol positions are "unlocked" by at least one of the following methods:

a) the appearance of one or more pre-determined symbols in a column "unlocks" all of the symbol positions in that column;

b) the appearance of one or more pre-determined symbols in a row "unlocks" all of the symbol positions in that row;

c) the appearance of one or more pre-determined symbols in the symbol matrix "unlocks" all of the symbol positions in the symbol matrix;

d) the appearance of one or more pre-determined symbols in a symbol position "unlocks" all of the symbol positions adjacent to that symbol position;

e) the appearance of one or more pre-determined symbols in a column "unlocks" all of the symbol positions above or below the pre-determined symbol(s);

f) the appearance of one or more pre-determined symbols in a row "unlocks" all of the symbol positions to the right or left of the pre-determined symbol(s);

g) the appearance of one or more pre-determined symbols in a pay line "unlocks" all of the symbol positions on that pay line; and h) the appearance of one or more pre-determined symbols in a pay line "unlocks" all of the symbol positions before or after the pre-determined symbol(s).

14. A method of claim 1, wherein the steps 1(f)(1) through 1(f)(3) are repeated a predetermined number of times until all symbol positions are "locked."

15. A method of claim 1, wherein the steps 1(f)(1) through 1(f)(3) are repeated a predetermined number of times, and optionally conclude prior to all symbol positions are "locked."

16. A method of claim 1, wherein the steps 1(f)(1) through 1(f)(3) are repeated a predetermined number of times, and optionally conclude prior to all symbol positions being "locked," according to at least one of the following methods:

a) A fixed number of re-spins of at least one symbol position, including at least one of:

i. a fixed number of re-spins of all symbol positions;

ii. a fixed number of re-spins of particular symbol positions;

iii. a fixed number of re-spins of pre-determined groups of symbol positions;

iv. a fixed number of re-spins of symbol positions in a column;

v. a fixed number of re-spins of symbol positions in a row;

vi. a fixed number of re-spins of symbol positions in a pay line; and vii. a fixed number of re-spins of particular symbols in the symbol set;

b) A variable number of re-spins of any or all symbol positions, including at least one of:

i. a variable number of re-spins of all symbol positions;

ii. a variable number of re-spins of particular symbol positions;

iii. a variable number of re-spins of pre-determined groups of symbol positions;

iv. a variable number of re-spins of symbol positions in a column;

v. a variable number of re-spins of symbol positions in a row;

vi. a variable number of re-spins of symbol positions in a pay line; and vii. a variable number of re-spins of particular symbols in the symbol set;

c) At least one of fixed and variable number of re-spins, and at least one symbol position are determined by at least one of:

i. wager amount;

ii. award amount;

iii. winning symbol combination;

iv. pre-determined symbol combination;

v. player input; and vi. at random.

17. A method of claim 1, wherein the steps 1(f)(1) through 1(f)(3) are repeated a predetermined number of times and optionally conclude prior to all symbol positions are "locked," with an award issued at the completion of the final re-spin.

18. A method of claim 1, wherein the steps 1(f)(1) through 1(f)(3) are repeated a predetermined number of times and optionally conclude prior to all symbol positions being "locked," with an award issued at the completion of the final re-spin and based upon at least one of the following methods:

a) wager amount;

b) number of re-spins;

c) locations of symbol positions involved in any or all of the re-spins;

d) number of symbol positions involved in any or all of the re-spins;
e) winning symbol combinations appearing during any or all of the re-spins;
f) pre-determined symbol combinations appearing during any or all of the re-spins;
g) player input at least one of before, during and after any or all of the re-spins; and
h) a random amount selected from within a range of pre-determined values.

19. A method of playing a game using a symbol matrix formed by a plurality of rows intersecting with a plurality of columns, with the plurality of rows and columns defining a plurality of symbol positions, comprising at least one of the sequential, non-sequential and sequence independent steps of:

a) randomly generating symbols for each symbol position in the symbol matrix;
b) displaying the symbols generated for each symbol position in the symbol matrix;
c) issuing awards for predetermined winning symbol combinations displayed in the symbol matrix;
d) setting the status of each symbol position as either "locked" or "unlocked" responsive to predetermined criteria;
e) when at least one symbol position is unlocked, repeating, until all symbol positions are locked, the following at least one of sequential, non-sequential and sequence independent steps of:
   1) randomly generating symbols for each unlocked symbol position;
   2) displaying the symbols generated for each unlocked symbol position which replaces a previously displayed symbol; and
   3) issuing at least one award for winning symbol combinations displayed in the symbol matrix.

20. A game machine for playing a game and having a symbol matrix formed by a plurality of rows intersecting with a plurality of columns, with the plurality of rows and columns defining a plurality of symbol positions, comprising:

Means for randomly generating symbols for each symbol position in the symbol matrix;
Means for displaying the symbols generated for each symbol position in the symbol matrix;
Means for issuing awards for predetermined winning symbol combinations displayed in the symbol matrix;
Means for setting the status of each symbol position as either "locked" or "unlocked" responsive to predetermined criteria, and when at least one symbol position is unlocked, means for repeating, until all symbol positions are locked, the functions of:
   1) randomly generating symbols for each unlocked symbol position;
   2) displaying the symbols generated for each unlocked symbol position which replaces a previously displayed symbol; and
3) issuing at least one award for winning symbol combinations displayed in the symbol matrix.

* * * * *

UNITED STATES PATENT AND TRADEMARK OFFICE

CERTIFICATE OF CORRECTION

PATENT NO. : 7,252,589 B1
APPLICATION NO. : 10/666560
DATED : August 7, 2007
INVENTOR(S) : Daniel M. Marks et al.

It is certified that error appears in the above-identified patent and that said Letters Patent is hereby corrected as shown below:

Title page Item [60] should read

Domestic Priority Information
Application Number: THIS APPLICATION
Continuity Type: CONTINUATION-IN-PART
Prior Application Number: 10/438,325
Filing Date (YYYY-MM-DD): MAY 15, 2003

Application Number: 10/438,325
Continuity Type: NON-PROVISIONAL OF
Prior Application Number: 60/380,485
Filing Date (YYYY-MM-DD): MAY 15, 2002

Application Number: THIS APPLICATION
Continuity Type: NON-PROVISIONAL OF
Prior Application Number: 60/412,012
Filing Date (YYYY-MM-DD): SEPTEMBER 20, 2002

Signed and Sealed this

Eleventh Day of August, 2009

David J. Kappos

David J. Kappos
*Director of the United States Patent and Trademark Office*